(No Model.) 6 Sheets—Sheet 1.

M. A. YEAKLEY.
PNEUMATIC HAMMER.

No. 568,395. Patented Sept. 29, 1896.

ATTEST.

INVENTOR (No Model.)  6 Sheets—Sheet 2.
M. A. YEAKLEY.
PNEUMATIC HAMMER.
No. 568,395.  Patented Sept. 29, 1896.
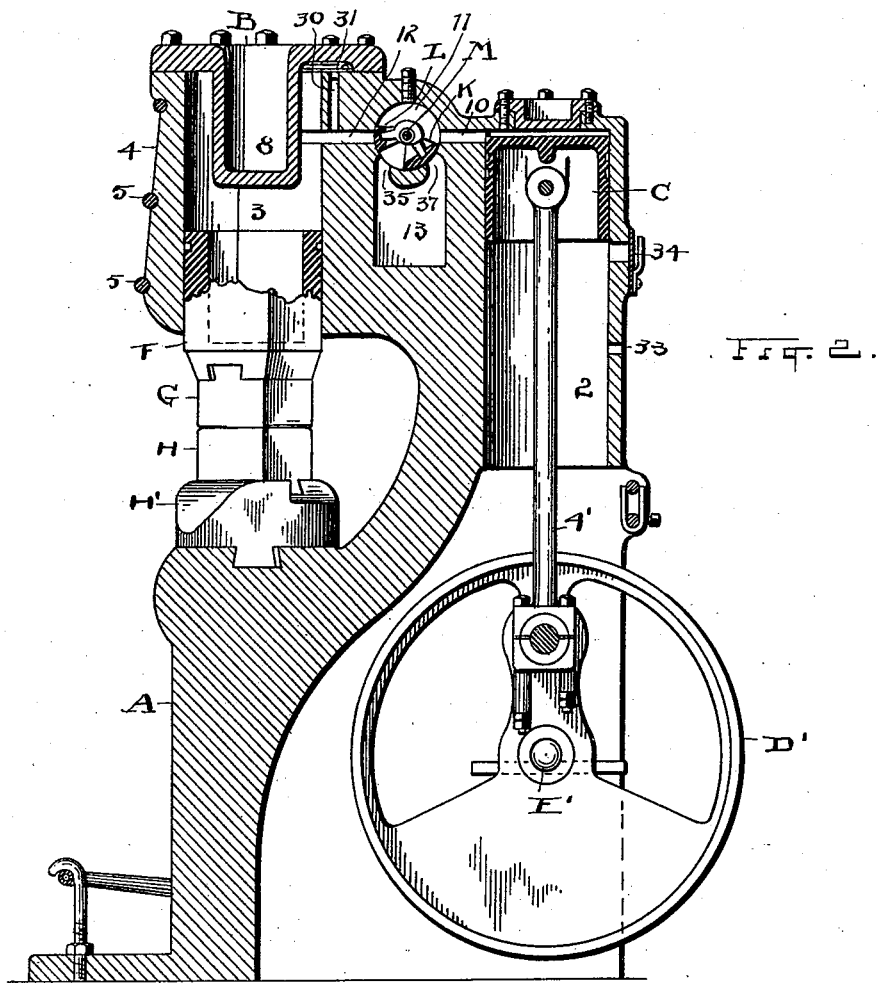
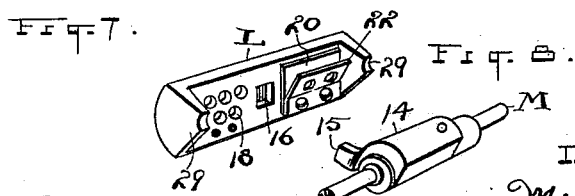
ATTEST.
W. B. Moser.
Allie Robertson.
INVENTOR.
Melvin A. Yeakley.
By H. J. Fisher ATTY

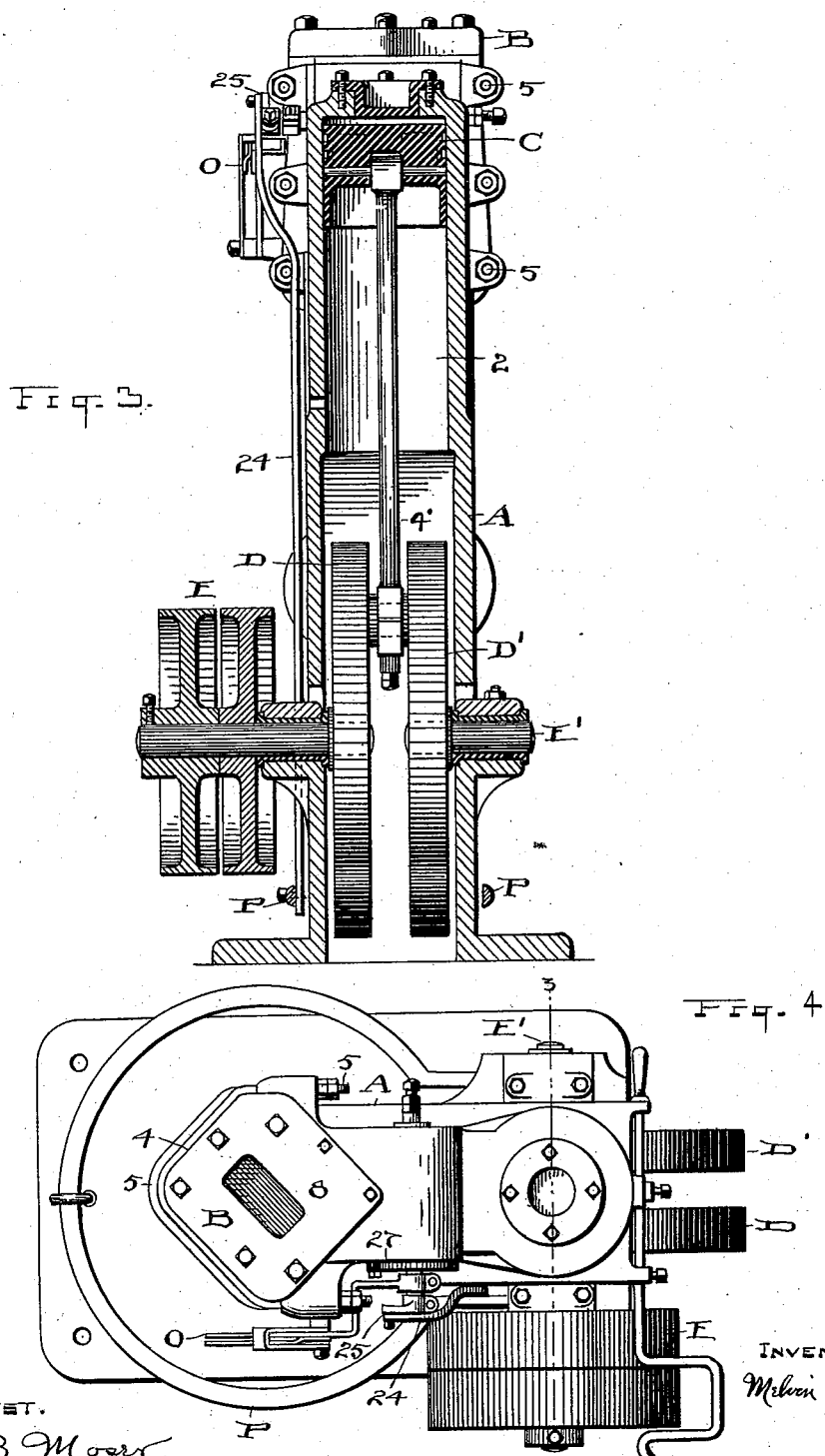

(No Model.)  
6 Sheets—Sheet 4.

M. A. YEAKLEY.
PNEUMATIC HAMMER.

No. 568,395.  
Patented Sept. 29, 1896.

ATTEST  
T. S. Moser  
Allie Robertson

INVENTOR.  
Melvin A. Yeakley  
By H. T. Fisher ATTY (No Model.) 6 Sheets—Sheet 5.

M. A. YEAKLEY.
PNEUMATIC HAMMER.

No. 568,395. Patented Sept. 29, 1896.

ATTEST
D. B. Moser
Allie Robertson

INVENTOR.
Melvin A. Yeakley.

BY H. T. Fisher ATTY

THE NORRIS PETERS CO., PHOTO-LITHO., WASHINGTON, D. C.

(No Model.) 6 Sheets—Sheet 6.
M. A. YEAKLEY.
PNEUMATIC HAMMER.
No. 568,395. Patented Sept. 29, 1896.
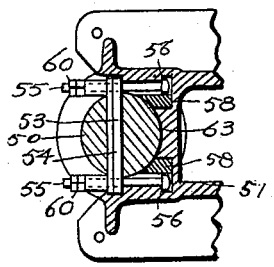
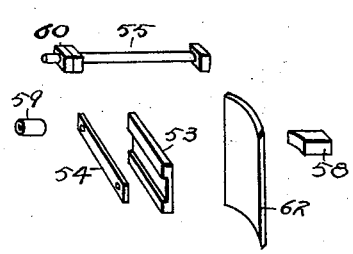
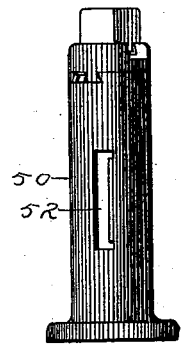
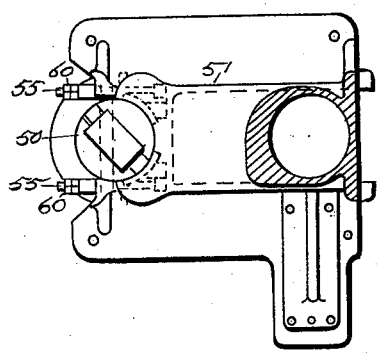
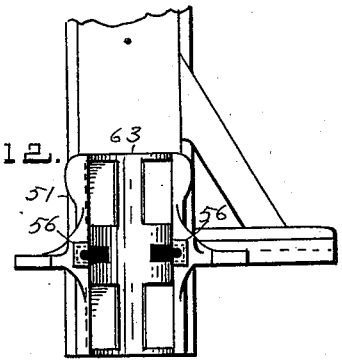
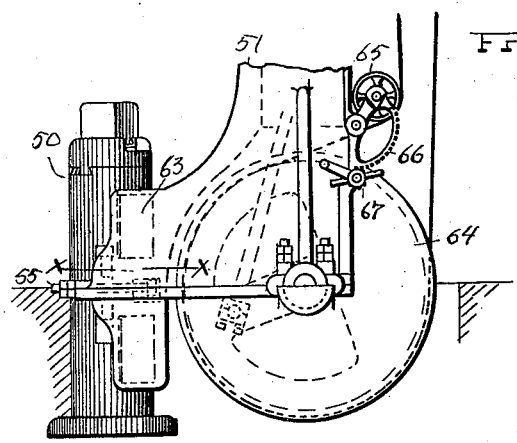
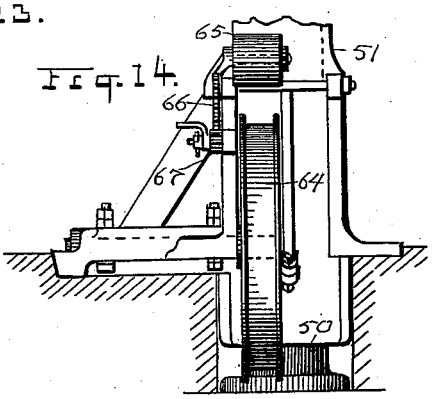
ATTEST.
INVENTOR.

UNITED STATES PATENT OFFICE.

MELVIN A. YEAKLEY, OF CLEVELAND, OHIO.

PNEUMATIC HAMMER.

SPECIFICATION forming part of Letters Patent No. 568,395, dated September 29, 1896.

Application filed October 11, 1895. Serial No. 565,340. (No model.)

*To all whom it may concern:*

Be it known that I, MELVIN A. YEAKLEY, a citizen of the United States, residing at Cleveland, in the county of Cuyahoga and State of Ohio, have invented certain new and useful Improvements in Pneumatic Hammers; and I do hereby declare that the following is a full, clear, and exact description of the invention, which will enable others skilled in the art to which it appertains to make and use the same.

My invention relates to pneumatic hammers; and the invention consists in the construction, combination, and arrangement of parts, substantially as shown and described, and particularly pointed out in the claims.

Figure 1:
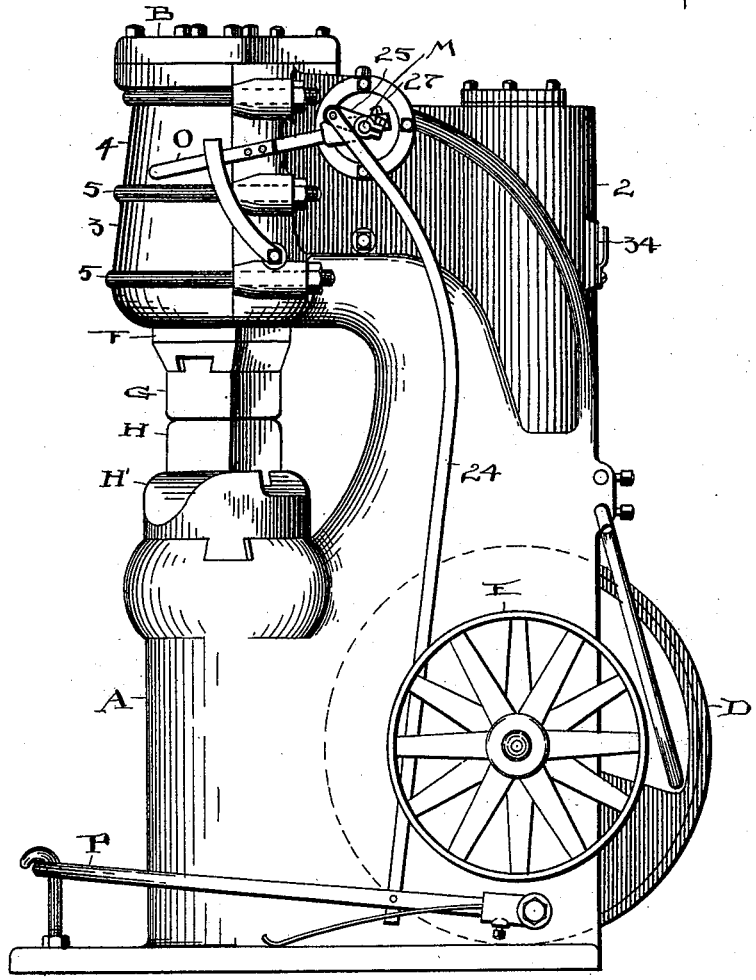
Figure 5:
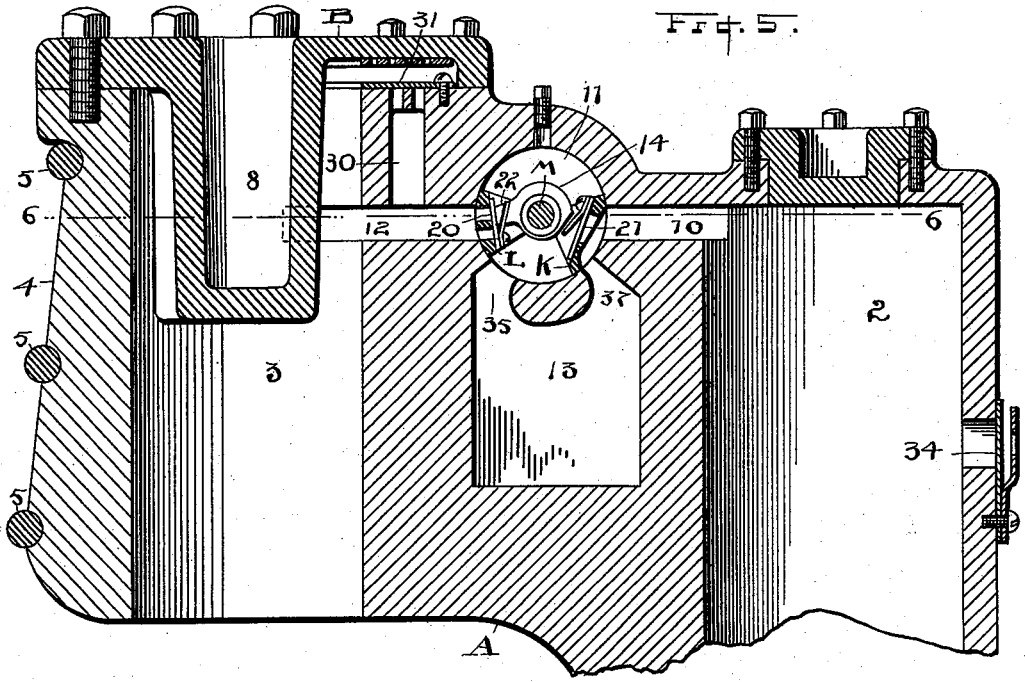
Figure 6:
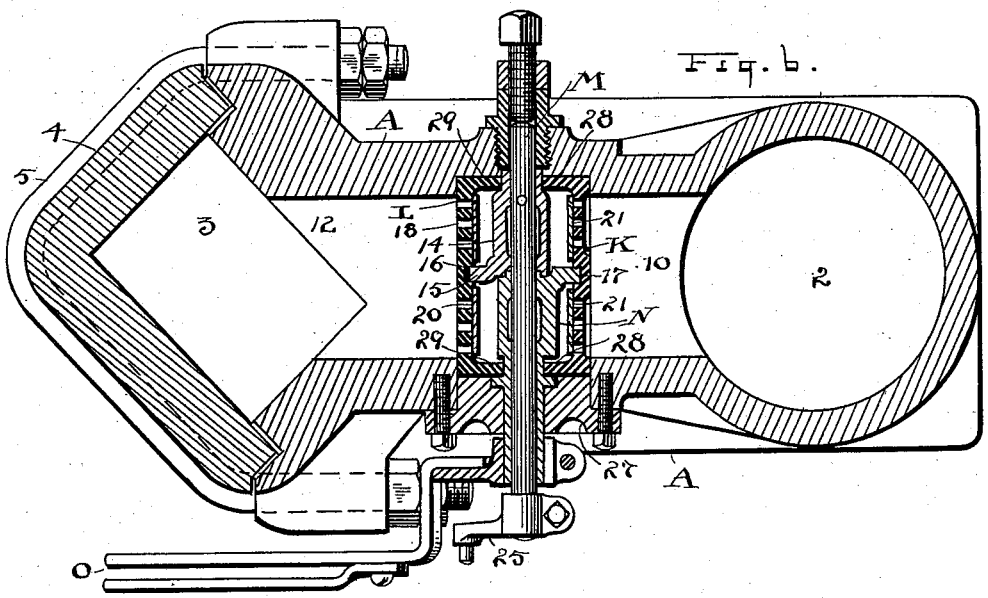
Figure 10:
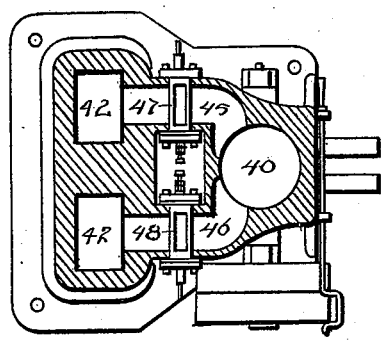
Figure 7:
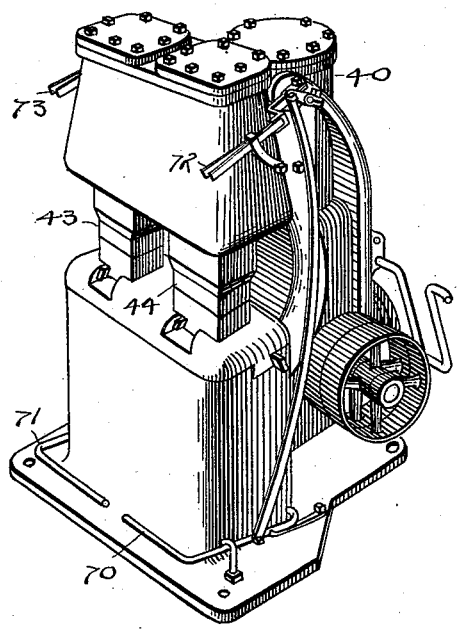

In the accompanying drawings, Figure 1 is a side elevation of a hammer which embodies my invention, showing one style of frame which may be adopted. Fig. 2 is a vertical central sectional elevation of the hammer shown in Fig. 1. Fig. 3 is a vertical central sectional elevation of the air-compression or power cylinder and piston and the power connections on a line corresponding to 3 3, Figs. 2 and 4. Fig. 4 is a plan view of the hammer shown in Fig. 1. Fig. 5 is an enlarged vertical central sectional elevation of the upper part of the hammer, corresponding to the upper portion of Fig. 2, but divested of the pistons and some other parts shown in said figure. Fig. 6 is a horizontal sectional plan view looking downward from a line corresponding to 6 6, Fig. 5. Fig. 7 is a detail in perspective of the valve which controls the inlet to the hammer-cylinder. Fig. 8 shows the sleeve by which said valve is actuated. Fig. 9 is a perspective view of a double hammer, in which the same general principles of constructions are present as in the foregoing figures. Fig. 10 is a horizontal sectional plan view of Fig. 9 on the lines substantially of the valves therein at the top. Fig. 11 is a plain elevation of the anvil, which in this case is separate from the body or frame of the hammer and is attachable and detachable, as hereinafter described. Fig. 12 is a front elevation of the construction of frame or body adapted to receive the block shown in Fig. 11. Fig. 13 is a side elevation of the section or portion of frame shown in Fig. 12 and the die-block fixed in position therein. Fig. 14 is an elevation of the same parts as in Fig. 13, but at right angles thereto. Fig. 15 is a plan view of some of the parts shown assembled in Fig. 13. Fig. 16 is a cross-section of the anvil and of the parts immediately connected therewith on a line corresponding to *x x*, Fig. 13. Fig. 17 shows the number of minor parts in a group and adapted to be used as hereinafter fully described.

A represents the body or frame of the hammer, which is provided with a suitable base and is variously constructed either to constitute operative parts in itself or to support such parts, as will now appear. Thus in this body or frame A are formed two piston-chambers, one at the rear and top, (represented by 2,) which constitutes the power cylinder or chamber, and the other at front and top, (represented by 3,) and constituting the hammer-piston chamber. This latter chamber, in this instance, is rectangular in cross-section, while the former chamber 2 is shown as circular in cross-section. It is immaterial what shape is adopted, and the shape of either or both chambers may be modified and still serve my purpose and not depart from the spirit of the invention. These chambers are shown here as in parallel lines, but they may be in divergent lines as well, especially chamber 2, in respect to chamber 3.

In the matter of chamber 3 I have, in this instance, preferably divided the said chamber vertically in two equal parts, half of which is formed in or by the body A and the other half in or by the part 4. This part or section furnishes two sides of the chamber and is secured in position by the binding-rods 5, a suitable packing being interposed between part 4 and the body part of the chamber, so as to make it a perfectly air-tight joint. This sectional construction of the chamber makes the chamber readily accessible at any time for repairs or any other purpose and enables me to take up wear upon its inside by the piston. Said chamber 3 is provided with a cap or cover B, which has an inwardly-projecting hollow portion 8 at its center, occupying the upper portion of said piston-chamber 3 and filling a certain amount of dead space in said chamber. This allows the hammer-piston the full stroke of the chamber without obstruction, and at the same time practically eliminates a large dead space, and thus renders it possible to operate with a much smaller volume of air than would otherwise be required. It also provides for the use of a hollow hammer-piston and enables me to use a piston of large area or cross-section, which obviously is very desirable.

The power or air compressing or reducing piston C operates in the cylinder or chamber 2, which is formed wholly in the body A and is turned true on its inside. The piston C is actuated from the crank fly-wheels D D', two being preferably used, and is connected therewith by rod 4'. The crank-wheels D D' are in turn actuated by a band-wheel E or other suitable power connection. In this instance said wheel E is on the same shaft as wheel D, but wheel D' is supported on its own short shaft E', and rod 4' connects said wheels with the piston C. While at work, piston C is kept constantly and regularly in movement.

Referring now again to hammer-piston chamber 3 we find therein the hammer piston or head F, having the hammer or upper die G fixed thereto. Beneath the said hammer is arranged the lower die H, resting upon a die-block H', which itself is supported upon the body A.

The several parts G, H, and H' are separate and separable, and the piston or head F is closely packed so as to avoid leakage. Said piston is substantially cup-shaped, thereby lightening it so far as weight is concerned and forming a cavity or chamber adapted to receive the projection 8 upon the cap B. It will be noticed that the piston F has no rod or other operating connections, and that it is wholly an atmospheric-actuated piston, governed exclusively by the atmosphere in all its movements.

Now in order that the atmospheric pressure and exhausts produced by the reducing piston C may be felt and utilized in the machine, it is necessary that there should be certain intervening mechanism between the power-producing chamber 2 and the power-utilizing chamber 3. To this end I have provided an air-channel directly from the upper portion of chamber 2 to the chamber 3, and in said channel are interposed suitable valves to control and regulate the flow of air back and forth, as will now appear. The through passage referred to is indicated by 10 and 12, sections of the same passage, and having a valve-chamber 11 between them. In this valve-chamber, which is barrel-shaped in cross-section, are located two rotating valves K and L, respectively, and beneath valve-chamber 11 and opening into the same is a chambered pocket or well 13. This well serves as a contraction and expansion chamber for the atmosphere and as a sort of reservoir, as will be seen in the description of operation. The valve K controls the flow of the air on the power side of the valve-chamber, and the valve L controls the flow of the air on the hammer side of the valve-chamber and the hammer-chamber 3 and incidentally to or from the well 13. Both these valves are segmental in cross-section and adapted to rotate closely upon the circular side of the chamber 11, and are substantially similar in construction, except as hereinafter noted. A shaft M, common to both said main valves K and L, is connected therewith, as shown in the several figures. Thus in Fig. 8 is seen a sleeve 14, fixed rigidly upon shaft M, and having a spur or projection 15, adapted to engage in a corresponding recess or opening 16 in the valve L, so that when the said shaft and its sleeve are rotated the engaged projection 15 will turn valve L in the direction of their movement, whether one way or another. Then to operate valve K, I provide another sleeve N, Fig. 6, having a projection 17, engaging in a recess corresponding to the like recess in valve L, but the sleeve N is free to be turned on shaft M. The valve L has itself a series of through perforations or openings 18, covered by flexible or flap valves 20, two such valves being used in this instance on said valve, and two others 21 of like character in valve K. In order that none of these valves should open too far, I have provided stop-plates or their equivalent 22 on the inside of the main valves K and L. Both said main valves are separately operative, the valve K being operative by a hand-lever O, fixed upon the projecting outer extremity of sleeve N, while the valve L is operated by treadle P, connecting-rod 24, and short arm 25, fixed on the end of shaft M, outside of lever O. The hand-lever therefore controls the valve next to the power-cylinder, while the treadle-lever controls the valve next to the hammer-chamber.

The valve-chamber 11 is formed in the body A and turned out true, and a cap-plate 27 is set into the otherwise open end thereof. The shaft M and the sleeve N project through this cap, and both ends of said chamber are suitably packed about the said shaft to avoid leakage of air. Both the main valves K and L have right-angled projections 28 and 29, respectively, Fig. 7, which bear against sleeves on shaft M, and both valves extend nearly half the length of chamber 11, meeting at the center.

Extending upward from the air-passage 12 in the wall of the chamber for the hammer piston or head is an air-passage 30, which has open communication at its top with the top of the said chamber through a flap-valve 31, arranged to close the said passage 30 from above. In this way the air in said piston-chamber becomes compressed, especially above the side passage 12, when the hammer-head ascends and the air at last forms a cushion for the said head, thus preventing the head from striking the top of the chamber and also forming back pressure to facilitate the downward stroke of the head by reason of the expansion of the atmosphere. The passage 30 and the valve 31 also serve to allow inflow of air in the top of said piston-chamber to accommodate the descent of the hammer and to facilitate the drop by letting in a full volume of air through the passage 30.

In operation, when it is desired to deliver regular and uniform blows with the hammer up to the full stroke thereof, it is my practice to open valves K and L to their full extent, thus leaving an unobstructed passage of the air back and forth through the passages 10 and 12. It will be understood that since the downstroke of the hammer is produced mainly by the pressure of the air proceeding from the upward stroke of the power-producing piston C the upstroke is produced by the exhaustion of the air from the hammer-head chamber and the atmospheric pressure outside, and the air first passes in through passages 10 and 12 and then out through the same passage, and the exhaustion from the hammer-chamber by the power-piston C on its downstroke is equivalent to the pressure produced on its upstroke. So it occurs that when the said piston C is down to the bottom of its stroke and past the vent-passage 33 in the power-chamber 2 a certain amount of air will rush in to supply any need occasioned by possible leakage in the machine and thus restore atmospheric equilibrium. However, when the parts are in perfect working condition and the piston C on its downstroke has passed the vent 33, the exhaust in the hammer-chamber and in the well 13 between said chambers should be so complete as to draw the hammer-head by a quick stroke to the top limit of its movement. Then, too, as the piston C returns on its upstroke, and when it has passed the valved outlet 34, the atmosphere is again compressed and the hammer is actuated as before.

It will be noticed that the downward movement of the hammer and its piston are facilitated by their own weight, and the compressed atmosphere is in a sense supplementary to their weight for producing the stroke.

If it be desired to make a half-blow, or rather to reduce the blow of the hammer one-half, the valve K will remain open and the valve L be half closed. It should have been stated that when open the valve L is carried downward, closing entirely the passage 35 to the well. Hence if the valve L be half closed this passage 35 will be only half open and the surplus pressure or the excess of one-half will descend into the well 13, and the well will thus take up what is not carried into the hammer-chamber. Further closing of the valve L will reduce the pressure or power in the hammer-chamber 3 correspondingly, and this reduction may be continued until pressure is entirely cut off, in which case the hammer is suspended without movement, notwithstanding the continued operation of the power-piston C. If the valve L be entirely closed as just suggested the atmosphere will be forced into and compressed in the well and valve-chamber and withdrawn therefrom as the piston C descends, and this alternate action will continue as long as passage 12 is closed. The well is large enough to accommodate the needs of the machine in these extreme operations. The hammer will be raised and suspended in raised position as long as valve L remains closed, and by means of the treadle, which controls valve L, the operator can graduate the blow from this dead-point according to the needs of the work. Indeed, the strokes or blows of the hammer may be graduated with the utmost nicety and may be run all the way from a very delicate touch down to an exceedingly powerful blow. When the valve L is closed, as in Figs. 2 and 5, the flap-valve 20 will permit air to be withdrawn from the hammer-chamber, but will not permit the air to enter therein, and all air becomes instantly withdrawn from the said chamber and the hammer is compelled to remain up until air is again admitted to said chamber to allow it to descend.

If it be desired to make the hammer operate as a clamp or grip to hold an object, the valve L is opened and the valve K closed, as seen in Fig. 5. This will permit air to be forced in behind the hammer-piston through flap-valves 21 in valve K into the well and out into the valve-chamber through flap-valves 20 in valve L, but no air can escape from said hammer-chamber because valve L now closes passage 35, and the pressure will remain at the maximum until valve L be again opened. There are also other uses of the said valve K in the working of the machine, which are easily and quickly learned by any one who is capable of operating the hammer.

Referring to Figs 9 and 10, we find the principles of construction set forth in the foregoing drawings and description also set forth in said figures, but in a double machine. That is, there is a single power-piston chamber 40, large enough for all purposes, and two hammer-piston chambers 42, and two hammers 43 and 44. With the exception that there are two hammers and corresponding chambers instead of one and a plurality of air-passages 45 and 46 and of valves 47 and 48, there is no essential difference in the construction of the double hammer and machine from the single hammer and machine shown in the preceding figures, and it is not deemed necessary to enter into a further description of this hammer for this reason. Obviously two operations may be carried on at the same time with a double hammer, or two hammers of the same or different sizes or styles may be employed, and one operator may go from one hammer to the other, and thus do in one heat what would otherwise require two heatings to accomplish. This implies that different kinds of hammers are needed to make the finished product, and one or more hammer-heads can be used with a single power-cylinder.

Referring now to the construction shown in Figs. 11 to 17, we find the important feature of the invention a separate and removable anvil 50, adapted to be attached to the body frame 51 of the machine by the means shown and described or their equivalent.

Referring to Fig. 11, it will be seen that there is a transverse slot 52 centrally through the said block, and this is traversed by the grooved hard-wood piece 53 and the metallic bar or strap 54. This bar 54 has holes through its ends which extend laterally beyond the anvil 50, and the securing-bolts 55 pass through these holes. As a convenient means of entering these bolts I form suitable recesses in the body of frame 51, with shoulders 56 to engage the heads of said bolts. Before placing the die-block in position the said bolts are introduced through the space occupied by the hard-wood block 58, and then moved outward to engage shoulders 56, after which the said blocks 58 are put in position. Then the anvil 50, with the parts 53 and 54 in slot 52, is moved bodily inward and the bolts 55 are engaged through the holes in bar 54, and the said bolts are then tightened by means of the sleeves 59 and securing-nuts 60.

In Fig. 17 I show a curved piece of hard wood 62, and I use four of these pieces, which are interposed between the anvil and the curved supporting-head 63 of the frame 51, so as to more perfectly secure the die-block in place and to cushion it against the supporting-frame. It will be noticed, too, that in this form of machine the body or frame 51 and the die-block really has its own foundation and thereby takes the shock of the hammer off the machine, which is very desirable. I also show in this view a band-wheel 64 and an idler 65, which is adapted to be adjusted by segment-rack 66, and a pinion 67 to tighten the band 68 as much as may be needed.

It should have been stated that each hammer in Fig. 9 has its own valve-operating mechanism consisting of treadles 70 and 71, respectively, and band-terms 72 and 73.

Obviously many of the details of construction hereinbefore specified might be modified or substituted and not depart from the spirit of the invention. Thus, for example, direct-acting instead of rotary valves might be used in the air-passage between the air-reducing cylinder and the hammer-cylinder, and still other parts might be changed without avoiding the character or essence of the invention.

The hammer can be operated satisfactorily with the well 13 as a single chamber, but I have found a more satisfactory operation by introducing a partition 80, thereby subdividing said chamber into compartments $a$ and $b$, the passage 35 leading to $a$ and the passage 37 to $b$. It will be noticed in Fig. 5 that if the valves K and L be situated as therein shown the compartments $a$ and $b$ may be filled with compressed air at an equal pressure, but the valve 21 will prevent the air from flowing back after piston C when it descends. It will therefore follow that compartment $a$ will remain full of compressed air while the piston C is running idle, and the compartment $b$ will take up the inforced air and the said air will expand back again behind piston C and thus prevent the taking in of fresh air through air-inlet opening 33 in cylinder 2. Thus the compartment $a$ and the valve-chamber above will be filled with compressed air, while as to compartment $b$ there will be free play of the air through passage 35 while piston C is running idle. By this construction and arrangement I avoid excessive pressure in compartment $a$ and tighten the running of the power-piston, because the compartment $b$ takes up and gives back the air before the piston C and thus tightens its stroke in both directions. Otherwise, if the said compartment $b$ were not there the air before the piston C would have to be forced through valve 21 and then in the backstroke there would be vacuum which, in turn, would retard the downstroke.

What I claim is—

1. In pneumatic hammers, a hammer chamber and piston and a power chamber and piston, an air-passage connecting one end of the power-chamber with the corresponding end of the hammer-chamber, a plurality of valves in said passage and separate means to operate said valves, substantially as described.

2. The hammer-chamber and the power-chamber and an air-passage connecting said chambers, a valve-chamber in said air-passage, separate valves in said chamber and each of said valves having independent operating mechanism, substantially as described.

3. The hammer-chamber and the power-chamber, a passage connecting said chambers and a valve-chamber in said passage, in combination with a shaft in said valve-chamber, separate valves on said shaft and separate means connected with said valves to operate them, substantially as described.

4. The hammer-chamber and the power-chamber and the pistons in said chambers, said chambers connected by an air-passage, and a valve in said passage constructed to be opened by suction from the power-chamber and to be closed by pressure from said chamber, whereby the hammer-piston is held in suspension in its chamber while the power-piston is at work, substantially as described.

5. The hammer-chamber and the power-chamber and a passage connecting said chambers, a valve-chamber interposed in said passage, and a valve over the entrance to said passage from said valve-chamber to the hammer-chamber and constructed to open under suction from the power-chamber and to close under pressure therefrom, and means to hold said valve in its operative position, substantially as described.

6. The hammer-chamber and the power-chamber and an air-passage connecting said chambers, a valve-chamber in said passage and a valve in said valve-chamber over the entrance to said passage from said valve-chamber to said power-chamber and constructed to open under pressure from the power-chamber and to close under suction from said chamber, substantially as described.

7. In pneumatic hammers, the hammer-chamber and hammer, the air compressing and exhausting cylinder and piston, a valved air-passage between said chamber and cylinder, and a well in said passage, and a secondary valved air-passage discharging directly into the top of the hammer-chamber, substantially as described.

8. The hammer described having a power piston and chamber and a hammer piston and chamber and a valved air-passage from the power-chamber to the compression end of the said hammer-piston chamber, and a well and a valve in said passage, substantially as described.

9. The hammer-chamber and the power-cylinder and the piston therein, and a valved air-passage connecting said chamber and cylinder, and the said air-passage branched at the hammer-chamber to discharge into the same at two different points above the piston in said chamber, substantially as described.

10. The power chamber and piston, the said chamber having a valved outlet at about the middle of the stroke of the piston in said cylinder-chamber, in combination with the hammer-chamber and the piston therein and a valved air-passage connecting the said chambers, substantially as described.

11. The piston-chamber, the power-chamber having a valved outlet at or near its middle portion and an air-passage connecting said chambers, and a valve in said passage constructed and arranged to close the passage to the hammer-chamber by pressure from the power-chamber and to open by suction or exhaust from said power-chamber, substantially as described.

12. In pneumatic hammers, the hammer piston and chamber, the power piston and chamber, a valved air-passage connecting said chambers and an air well or pocket opening to said passage, substantially as set forth.

13. In a pneumatic hammer, a body or frame formed with power-piston and hammer-piston chambers, an air-passage connecting said chambers and a plurality of valves in said passage, substantially as set forth.

14. In a pneumatic hammer, a hammer-piston chamber formed in vertical sections and bands or straps to bind said sections together, substantially as set forth.

15. The hammer described having a power-piston chamber provided with an outlet at its top to the hammer-piston chamber and a valved outlet near its top emptying into the open air, substantially as set forth.

16. In a pneumatic hammer, a hammer-piston chamber and a power-piston chamber, an air-passage connecting said chambers, a valve-chamber in said passage, valves in said valve-chamber and means to control said valves, substantially as set forth.

17. In a pneumatic hammer, an air-passage connecting the hammer-piston chamber with the power-piston chamber, a valve-chamber in said passage, a well beneath said valve-chamber and a pair of valves controlling said air-passage and said well, substantially as set forth.

18. In a pneumatic hammer, the respective pistons and chambers and the single air-passage connecting the said chambers, a transverse barrel-shaped valve-chamber in said passage, a pair of valves in said chamber, a shaft on which said valves are separately mounted and separate valves connected with said valves to operate them, substantially as set forth.

19. In a pneumatic hammer, the power piston and chamber and the hammer piston and chamber, and an air-passage connecting said chambers having a valve-chamber and a compartmented well beneath said valve-chamber and in communication therewith, substantially as described.

20. The hammer-chamber and the air-compression chamber, a passage between said chambers having an air-well divided into two compartments and valves in said passage to cut off the flow of air to and from the hammer-chamber and to limit the flow of air to said compartments, substantially as described.

21. The hammer-chamber and an air-passage leading to said chamber having a valve-chamber, a well beneath said valve-chamber having two compartments and valves in said valve-chamber controlling the openings to said compartments, substantially as described.

Witness my hand to the foregoing specification of this 9th day of October, 1895.

MELVIN A. YEAKLEY.

Witnesses:
 H. T. FISHER,
 H. E. MUDRA.